(12) United States Patent
Zheng et al.

(10) Patent No.: US 12,744,647 B2
(45) Date of Patent: Sep. 22, 2026

(54) SYSTEMS, METHODS, AND DEVICES FOR TCI CONFIGURATION

(71) Applicant: ZTE Corporation, Shenzhen (CN)

(72) Inventors: Shuang Zheng, Shenzhen (CN); Nan Zhang, Shenzhen (CN); Wei Cao, Shenzhen (CN); Ziyang Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 276 days.

(21) Appl. No.: 18/617,253

(22) Filed: Mar. 26, 2024

(65) Prior Publication Data

US 2024/0243885 A1 Jul. 18, 2024

Related U.S. Application Data

(63) Continuation of application No. PCT/CN2022/089116, filed on Apr. 25, 2022.

(51) Int. Cl.

| | |
|---|---|
| ***H04L 5/00*** | (2006.01) |
| ***H04W 72/231*** | (2023.01) |
| ***H04W 72/541*** | (2023.01) |

(52) U.S. Cl.

CPC ......... *H04L 5/0053* (2013.01); *H04W 72/231* (2023.01); *H04W 72/541* (2023.01)

(58) Field of Classification Search

None

See application file for complete search history.

(56) References Cited

U.S. PATENT DOCUMENTS

| | | | | |
|---|---|---|---|---|
| 2021/0314953 | A1 | 10/2021 | Park et al. | |
| 2022/0053433 | A1 | 2/2022 | Abedini et al. | |
| 2022/0053486 | A1* | 2/2022 | Abedini | H04B 7/0696 |
| 2023/0327735 | A1* | 10/2023 | Awadin | H04B 7/0695 |
| 2023/0362817 | A1* | 11/2023 | Da Silva | H04W 24/10 |

FOREIGN PATENT DOCUMENTS

| | | | |
|---|---|---|---|
| CN | 111201721 | A | 5/2020 |
| CN | 113972969 | A | 1/2022 |
| WO | WO-2020/165736 | A1 | 8/2020 |
| WO | WO-2021/095181 | A1 | 5/2021 |
| WO | WO-2022/017334 | A1 | 1/2022 |

(Continued)

OTHER PUBLICATIONS

Foreign Office Action on Korean Appl. No. 10-2024-7010717 dated Oct. 28, 2025 (8 pages, with English translation).

(Continued)

*Primary Examiner* — Diane L Lo

(74) *Attorney, Agent, or Firm* — Foley & Lardner LLP

(57) ABSTRACT

The present disclosure is directed to TCI configuration, including receiving, by a network node, one or more Transmission Configuration Indicator (TCI) states for one or more links, the one or more links including at least one of a first forwarding link from the network node to a wireless communication device, or a second forwarding link from the wireless communication device to the network node, where the one or more TCI states each correspond to a corresponding one of a plurality of forwarding beams for the first forwarding link or the second forwarding link.

20 Claims, 4 Drawing Sheets

(56) References Cited

FOREIGN PATENT DOCUMENTS

WO WO-2022/035528 A1 2/2022

OTHER PUBLICATIONS

Notice of Reasons for Rejection for JP Appl. No. 2024-519600, dated Mar. 17, 2025 (with English translation, 5 pages).
Qualcomm, "NR Smart Repeaters for Rel-18", 3GPP TSG RAN Rel-18 workshop, RWS-210019, Jul. 2, 2021, Electronic Meeting (14 pages).
International Search Report and Written Opinion for PCT Appl. No. PCT/CN2022/089116 mailed Nov. 25, 2022 (8 pages).
ZTE, "Enhancements on Multi-beam Operation", 3GPP TSG RAN WG1 Meeting #106bis-e, R1-2108870, Oct. 19, 2021, e-Meeting (26 pages).
Extended European Search Report for EP Appl. No. 22938900.2, dated Sep. 25, 2024 (10 pages).
Notice of Reasons for Rejection for JP Appl. No. 2024-519600, dated Aug. 4, 2025 (with English translation, 8 pages).

* cited by examiner

SYSTEMS, METHODS, AND DEVICES FOR TCI CONFIGURATION

CROSS-REFERENCE TO RELATED APPLICATION

This application claims the benefit of priority under 35 U.S.C. § 120 as a continuation of PCT Patent Application No. PCT/CN2022/089116, filed on Apr. 25, 2022, the disclosure of which is incorporated herein by reference in its entirety.

TECHNICAL FIELD

The disclosure relates generally to wireless communications and, more particularly, to systems, methods, and non-transitory computer-readable media for TCI configuration.

BACKGROUND

As the new radio (NR) system moves to higher frequencies (around 4 GHz for FR1 deployments and above 24 GHz for FR2), propagation conditions degrade compared to lower frequencies exacerbating the coverage challenges. As a result, further densification of cells may be necessary. While the deployment of regular full-stack cells is preferred, it may not be always a possible (e.g., not availability of backhaul) or economically viable option. To provide blanket coverage in cellular network deployments with relatively low cost, RF repeaters with full-duplex amplify-and-forward operation have been used in 2G, 3G and 4G systems. However, the major problem brought by the RF repeater is that it amplifies both signal and noise and increases interference in the system.

Another common property of the NR systems is the use of multi-beam operation with associated beam management in the higher frequency bands defined for TDD. The multi-antenna techniques consisting of massive MIMO for FR1 and analog beamforming for FR2 assist in coping with the challenging propagation conditions of these higher frequency bands. The RF repeater without beam management functions cannot provide beamforming gain in its signal forwarding.

SUMMARY

To cope with the unwanted interference, a smart node (SN) can be considered, which makes use of the control information from its connected BS to enable an intelligent amplify-and-forward operation. In this disclosure, a method for beam information indication is proposed for a cellular network with the smart nodes (SNs).

The example arrangements relate to TCI configuration. Present implementations can include a wireless communication method. The method can include receiving, by a network node, one or more Transmission Configuration Indicator (TCI) states for one or more links, the one or more links including at least one of a first forwarding link from the network node to a wireless communication device, or a second forwarding link from the wireless communication device to the network node, where the one or more TCI states each correspond to a corresponding one of a plurality of forwarding beams for the first forwarding link or the second forwarding link.

In some arrangements, the one or more TCI states are TCI states associated a plurality of logic reference signal indices or identifiers (IDs), respectively.

In some arrangements, the plurality of logic reference signal indices or IDs are defined by a wireless communication node or an operations administration and maintenance (OAM) unit.

In some arrangements, the plurality of logic reference signal indices or IDs are indicated to the network node by a wireless communication node.

In some arrangements, a mapping relationship between the plurality of logic reference signal indices or IDs and the plurality of forwarding beams are indicated to the network node by a wireless communication node.

In some arrangements, the one or more TCI states include at least one TCI state directly indicating a corresponding one of the forwarding beams.

In some arrangements, the plurality of logic reference signal indices or IDs are SSB indices or CSI-RS indices, respectively.

In some arrangements, the mapping relationship is updated and indicated to a network node by the wireless communication node.

In some arrangements, at least one of the one or more TCI states, which is associated with a corresponding one of the logic reference signal indices or IDs indicated to the network node by a wireless communication node, is different from another one of the one or more TCI states corresponding to a beam of the network node for other links.

In some arrangements, at least one of the one or more TCI states, which is associated with a corresponding one of the logic reference signal indices or IDs indicated to the network node by a wireless communication node, is separately configured or belongs to a different part of configuration by the wireless communication node comparing to another one of the one or more TCI states corresponding to a beam of the network node for other links.

The method can further include receiving, by the network node, a new radio resource control (RRC) signaling indicating at least one valid timing information associated with at least one of the plurality of forwarding beams.

In some arrangements, the valid timing information is in a first format that has a number of time units.

In some arrangements, the valid timing information is in a second format that has a starting time and a time length.

In some arrangements, the valid timing information is in a third format that has a starting time and an ending time.

The method can further include receiving, by the network node, a new medium access control control element (MAC CE) signaling configuring at least one valid timing information associated with at least one of the plurality of forwarding beams.

The method can further include the valid timing information is in a first format that has a number of timing units.

In some arrangements, the valid timing information is in a second format that has s starting time and a time length.

In some arrangements, the valid information is in a third format that has a starting time and an ending time.

The method can further include receiving, by the network node, a new downlink control information (DCI) signaling having a field indicating at least one valid timing information associated with at least one of the plurality of forwarding beams.

The method can further include receiving, by the network node, a legacy downlink control information (DCI) signaling having a field indicating valid timing information associated with at least one of the plurality of forwarding beams.

The method can further include receiving, by the network node, a high layer parameter indicating whether to send feedback information regarding the plurality of forwarding beams to a wireless communication node.

The method can further include receiving, by the network node, the TCI state list from a wireless communication node or an operations administration and maintenance (OAM) unit.

The method can include sending, by a wireless communication node to a network node, one or more Transmission Configuration Indicator (TCI) states for one or more links, the one or more links including at least one of a first forwarding link from the network node to a wireless communication device, or a second forwarding link from the wireless communication device to the network node, where the one or more TCI states each correspond to a corresponding one of a plurality of forwarding beams for the first forwarding link or the second forwarding link.

In some aspects, a wireless communications apparatus can include a processor and a memory, where the processor is configured to read code from the memory and implement a method in accordance with present implementations.

In some aspects, a computer program product can include a computer-readable program medium code stored thereupon, the code, when executed by a processor, causing the processor to implement a method in accordance with present implementations.

The above and other aspects and their arrangements are described in greater detail in the drawings, the descriptions, and the claims.

BRIEF DESCRIPTION OF THE DRAWINGS

Various example arrangements of the present solution are described in detail below with reference to the following figures or drawings. The drawings are provided for purposes of illustration only and merely depict example arrangements of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example arrangements of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example arrangements and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
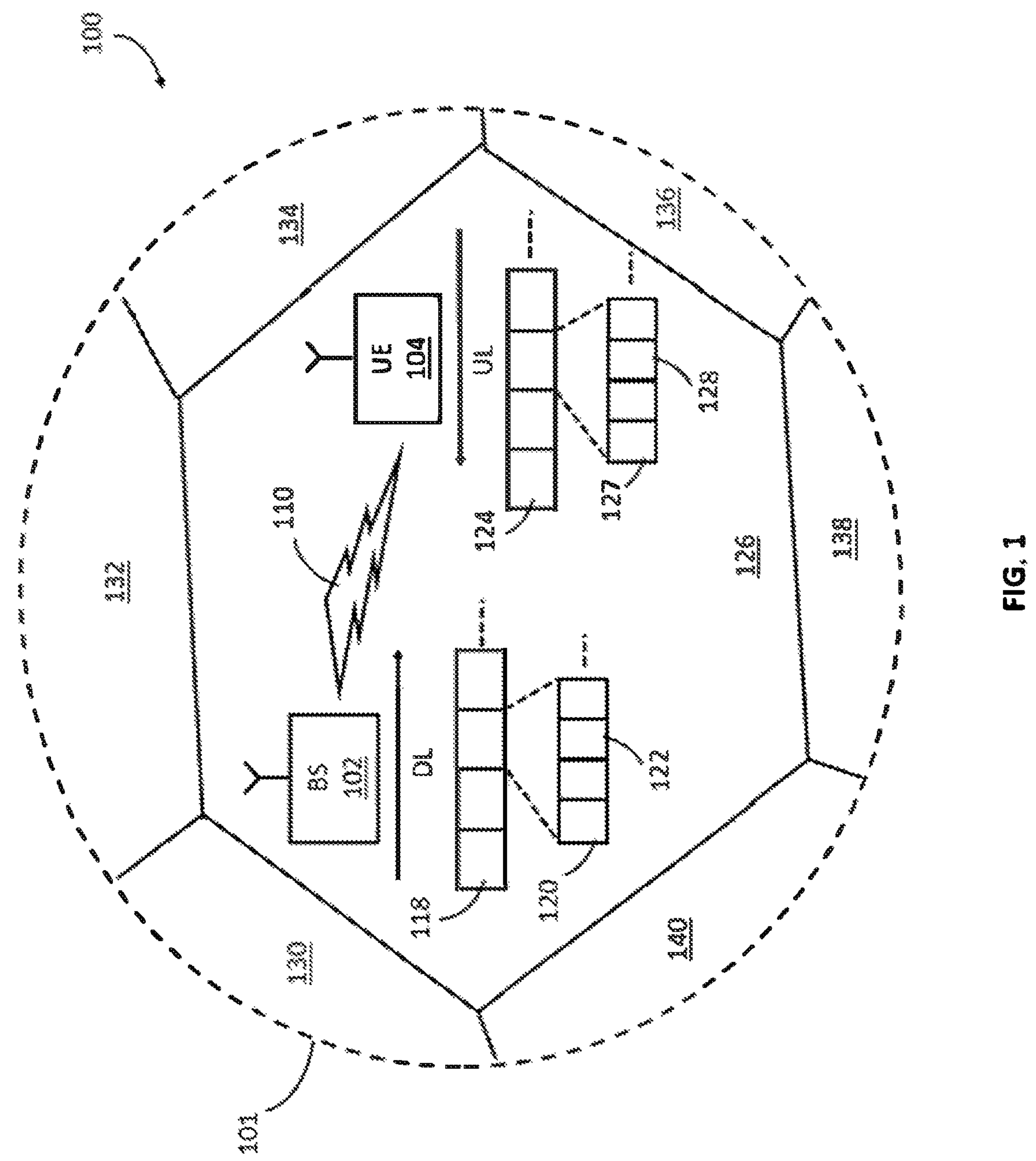
FIG. 1 illustrates an example wireless communication network, and/or system, in which techniques disclosed herein may be implemented, in accordance with some arrangements.

FIG. 1 illustrates an example wireless communication network, and/or system, 100 in which techniques disclosed herein may be implemented, in accordance with an arrangement of the present disclosure. In the following discussion, the wireless communication network 100 may be any wireless network, such as a cellular network or a narrowband Internet of things (NB-IOT) network, and is herein referred to as "network 100." Such an example network 100 includes a base station 102 (also referred to as wireless communication node) and a UE device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the base station 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the base station 102 may operate at an allocated channel transmission bandwidth to provide adequate coverage to the UE 104. The base station 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the base station 102 and UE 104 are described herein as non-limiting examples of "communication nodes," generally, which can practice the methods disclosed herein. Such communication nodes may be capable of wireless and/or wired communications, in accordance with various arrangements of the present solution.

Figure 2:
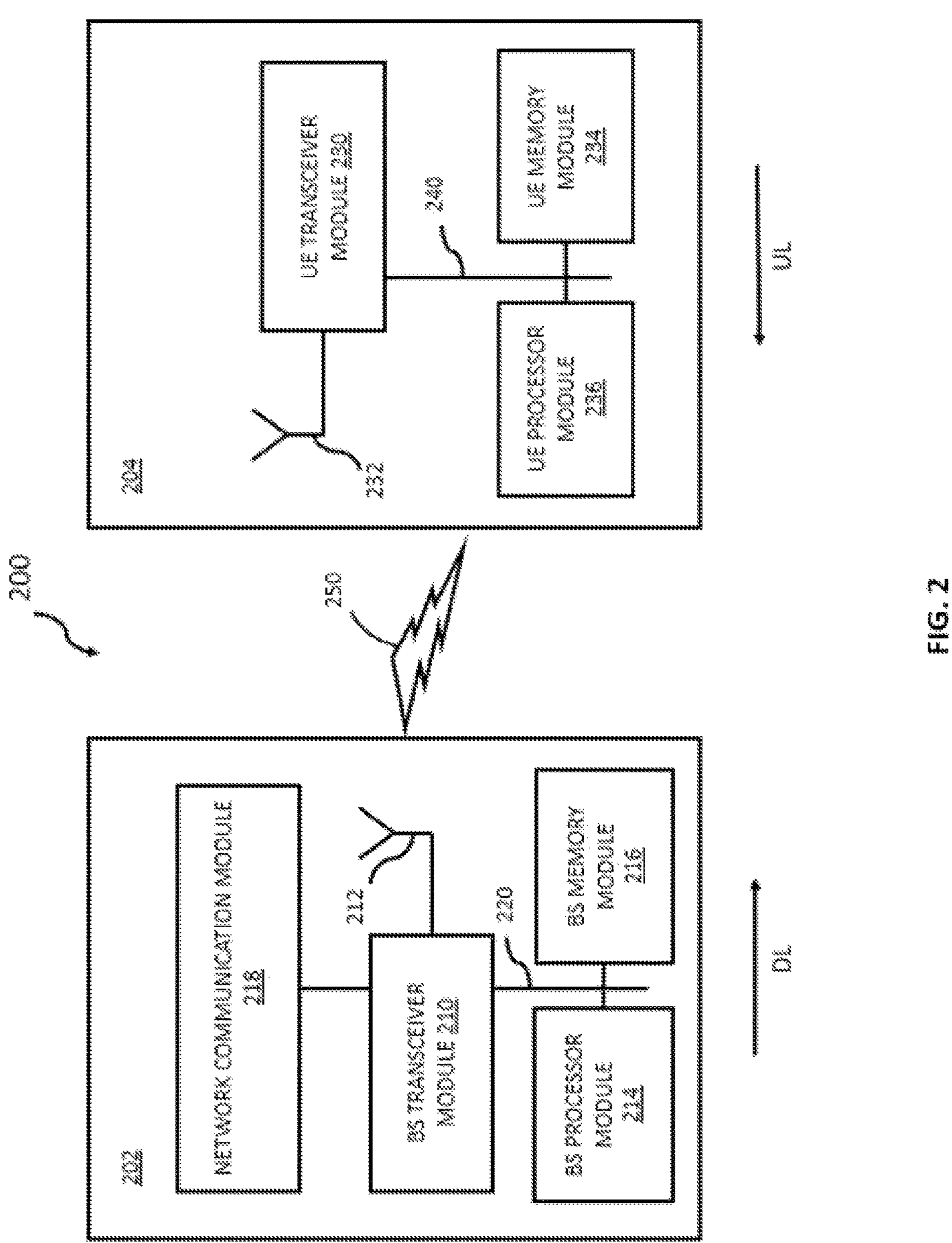
FIG. 2 illustrates a block diagram of an example wireless communication system for transmitting and receiving wireless communication signals in accordance with some arrangements.

FIG. 2 illustrates a block diagram of an example wireless communication system 200 for transmitting and receiving wireless communication signals (e.g., OFDM/OFDMA signals) in accordance with some arrangements of the present disclosure. The system 200 may include components and elements configured to support known or conventional operating features that need not be described in detail herein. In one illustrative arrangement, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the arrangements disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some arrangements, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some arrangements, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some arrangements, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative arrangements, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various arrangements, the BS 202 may be an evolved node B (cNB), gNB, a serving eNB, a target eNB, a femto station, or a pico station, for example. In some arrangements, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the arrangements disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some arrangements, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Figures 3, 4:
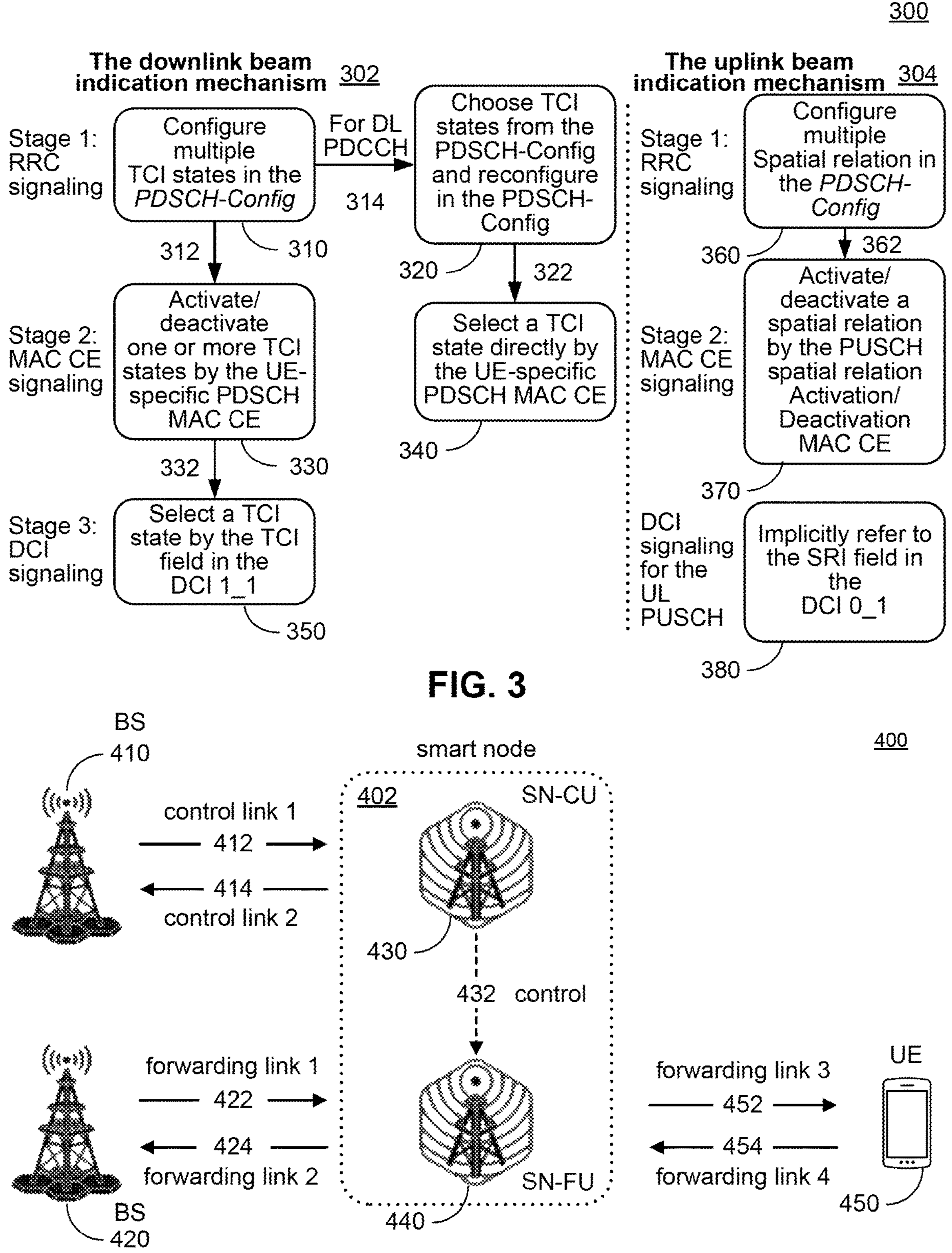
FIG. 3 is a diagram illustrating beam indication for TCI configuration, according to various arrangements.
FIG. 4 is a diagram illustrating link configuration for TCI configuration, according to various arrangements.

FIG. 3 is a diagram illustrating beam indication for TCI configuration, according to various arrangements. As illustrated by way of example in FIG. 3, an example beam indication 300 can include a downlink beam indication portion 302 and an uplink beam indication portion 304.

The downlink beam indication portion 302 can include actions 310 and 320 associated with a first stage corresponding to RRC signaling, actions 330 and 340 associated with a second stage corresponding to MAC CE signaling, and action 350 associated with a third stage corresponding to DCI signaling. The action 310 can configure multiple TCI states in the PDSCH-Config and can transmit transmission 312 and transmission 314 for DL PDCCH. The action 310 can choose TCI states from the PDSCH-Config and reconfigure in the PDCCH-Config, can receive transmission 314, and can transmit transmission 322. The action 330 can activate or deactivate one or more TCI states by the UE-specific PDSCH MAC CE, and can transmit transmission 332. The action 340 can select a TCI state by the TCI field in the DCI 1_1, and can receive the transmission 332.

The uplink beam indication portion 304 can include action 360 associated with a first stage corresponding to RRC signaling, action 370 associated with a second stage corresponding to MAC CE signaling, and action 380 associated with a third stage corresponding to DCI signaling for the UL PUSCH. The action 360 can configure multiple spatial relations in the PDSCH-Config and can transmit transmission 362. The action 370 can activate or deactivate a spatial relation by the PUSCH spatial relation activation or deactivation MAC CE, and can receive the transmission 362. The action 380 can implicitly refer to the SRI field in the DCI 1_1.

RF repeaters can be used in 2G, 3G and 4G deployments to supplement the coverage provided by regular full-stack cells with various transmission power characteristics. They constitute the simplest and most cost-effective way to improve network coverage. Within RF repeaters, there are different categories depending on the power characteristics and the amount of spectrum that they are configured to amplify (e.g., single band, multi-band, etc.). RF repeaters are non-regenerative type of relay nodes and they simply amplify-and-forward everything that they receive. RF repeaters are typically full-duplex nodes and they do not differentiate between UL and DL from transmission or reception standpoint. The main advantages of RF repeaters are their low-cost, their case of deployment and the fact that they do not increase latency. RF repeaters may amplify signal and noise and, hence, may contribute to an increase of interference in the system. The RF repeaters can lack beam management, which means they cannot provide beamforming gain in its signal forwarding.

The beam information of the downlink (DL) and uplink (UL) are separately indicated. A unified TCI framework for DL and UL beam indication can be advantageous. In the unified TCI framework, there is a common TCI state pool for unified TCI state(s) for both DL and UL. The data and control transmission/reception for DL and UL can be separately indicated by the independent TCI state with different signaling, or jointly indicated by a common TCI state with a single signaling. The DCI-based signaling update of TCI state can also be considered in the unified TCI framework.

FIG. 4 is a diagram illustrating link configuration for TCI configuration, according to various arrangements. As illustrated by way of example in FIG. 4, an example configuration 400 can include a first BS 410, a second BS 420, SN 402 including SN-CU 430 and SN-FU 440, and UE 450. The first BS 410 can transmit a first control link 412 and receive a second control link 414. The second BS 420 can transmit a first forwarding link 422 and receive a second forwarding link 424. The SN-CU 430 can transmit a control signal 432 and the second control link 414, and can receive the first control link 412. The SN-FU 440 can receive the control signal 432, the first forwarding link 422 and a fourth forwarding link 454, and can transmit the second forwarding link 424 and a third forwarding link 452. The UE 450 can receive the third forwarding link 452 and transmit the fourth forwarding link 454.

An SN is generally located in a selected position with good wireless channel condition (e.g., with LOS path) to the BS. When the SN starts up, a network integration procedure is carried out. Via this network integration procedure, the BS identifies the SN as a network node and configures the SN for its following amplify-and-forward operation. After the completion of integration, the SN carries out amplify-and-forward operation for UEs in its coverage with the control information received from the BS. The SN can include functional parts including the control unit (CU) and the forwarding unit (FU). Control links between the BS and the SN-CU are called the communication link. The index 1 and 2 indicates DL and UL directions, respectively. Using the communication link, the SN-CU acts like a UE to carry out initial access, measurements and reception of control information. The control information for the SN-FU is also received by the SN-CU from the BS via the communication link.

Forwarding links can be used between the BS and the SN-FU, and between the SN-FU and the UE. Similarly, the index 1~4 are used to indicate directions. The SN-FU carries out intelligent amplify-and-forward operation using the control information received by the SN-CU from the BS. For the communication link, the beam management procedure between the BS and the SN-MT can reuse the current NR specification, and some simplified methods can be considered. For the first and second forwarding links 422 and 424, the beam can be same as the first and second control links 412 and 414. For the third and fourth forwarding links 452 and 454, the beam indication can use the TCI framework with refinements.

Present implementations can include a step-based beam indication by TCI framework. Beam information can be indicated by TCI framework and is associated to reference signals with a corresponding quasi-colocation (QCL) type D. However, there is no reference signal defined for the third and fourth forwarding links between SN-FU and UE. In this case, if TCI framework is reused for the third and fourth forwarding link, some refinements are advantageous.

As one example, BS configures the SN with TCI state list for beam indication. Once integrated to the BS, the number of beams of SN-FU can be indicated to the BS. If the TCI framework is reused, similar to the legacy TCI configuration, the TCI state list can be configured to the SN for the beam indication of the forwarding link 3 and 4 after SN is integrated and accessed to the BS. The TCI state list for the SN-FU can be configured with various options. As one example, the BS configures the TCI state list for the SN-FU and indicates to the SN-FU. As another example, the TCI state list for the SN-FU are configured by the OAM, and the TCI state list should be indicated to the BS via OAM or reported by SN. As another example, where there is no reference signal defined for the third and fourth forwarding links between SN-FU and UE, various options can be considered.

As one example, the legacy TCI state configuration can be reused with a set of logic reference signal (e.g. CSI-RS) index/ID can be defined by BS or configured by OAM. The defined logic reference signal index/ID are mapped to the corresponding forwarding beam of SN-FU for the third and fourth forwarding links, and need to be indicated to SN by BS or OAM. In this case, these logic reference signal index/ID can be used in legacy TCI state field (e.g., CSI-RS or SSB field in TCI-State IE) to implicitly indicate the beam information for the third and fourth forwarding links.

To be more specific, when the BS configures the TCI state of the third and fourth forwarding links for SN, various further options can be considered. As one example, the legacy TCI state can be reused and divided into two parts. Two new higher layer parameters are considered. The first part with up to L1 TCI states configurations for the first and second control links, where L1 depends on the SN-CU capability maxL1, which can correspond to the maximum number of beams (or spatial filters) that the SN-CU can support on the communication link. The second part with up to L2 unified TCI states configurations for the third and fourth forwarding links, where L2 depends on the SN-FU capability maxL2. If maxL1 and maxL2 is preconfigured by BS or OAM, these two fields are optional. The legacy TCI state can be directly reused with the defined logic reference signal index/ID different from the reference signal index/ID of first and second control links.

As one example, a new type of TCI state can be defined to indicate the beam information, which can be indicated directly by an ID instead of reference signal with QCL type D. The ID is mapped to the forwarding beam of SN-FU. This new type of TCI state can be only applicable for SN, which is absent for UE. As another example, the SN-FU can be configured by the BS with a list of up to M TCI-State2 configurations, which can be included in the higher layer parameter PDSCH-Config for the SN-MT. The value M depends on the SN-FU capability max NumberConfiguredTCIstate2.

As one example, the BS indicates UE/UE group beam information. If the UE is served by the SN, the BS needs to indicate the beam information to the SN for the forwarding operation. Considering that the BS has the TCI state list of SN has already configured, following operations can be considered. As one example, a semi-static indication can include RRC and MAC CE.

The indication 710 can include a TCI indication for the third and fourth forwarding links. The configuration 720 can include a TCI configuration by RRC. The configuration 730 can include a TCI configuration by MAC CE. The configuration 740 can include a TCI selection by downlink control information (DCI). The action 722 can reuse a legacy TCI and define a logic RS index or ID. The action 724 can use a new type of TCI without an RS index. The action 732 can be associated with a new MAC CE to activate. The action 734 can reuse a legacy MAC CE with a new higher layer parameter to indicate an association with third and fourth forwarding links. The action 742 can indicate a new DCI format to select. The action 744 can reuse a legacy DCI with a new higher layer parameter to indicate an association with third and fourth forwarding links. The action 746 can indicate a new field defined in a legacy DCI to select. As one example, a dynamic indication can include RRC and MAC CE.

As one example, the BS indicates the valid timing information for the selected TCI state to SN. When the BS indicates the beam information of third and fourth forwarding links to the SN via the TCI state, the SN can also know the valid time to use the corresponding beam to forward the signal. In this case, the BS can indicate the valid timing information to the SN. Consider the TCI framework, various options can configure the valid timing information.

As one example, configuration can be via RRC. A new RRC configuration TDD-beam-Config can be defined to indicate the valid time of the beam for SN-FU to forward the signal. In this new RRC configuration, the valid time (e.g., slot-level or symbol level) of different TCI state is configured. The format of valid time indication can be considered with various options. As another example, valid timing information of the different forwarding beam is indicated by the number of time units, the time units can be slot-level or symbol level.

If the valid timing information is indicated by the following format, valid timing information of different TCI state can be configured with time order. The valid timing information of the different forwarding beam is indicated by the valid time interval, which means the valid time information of the configured TCI state can be one or more of a start time plus a time length, or a start time plus an end time.

As one example, configuration can be via MAC CE. The MAC CE can be used to configure the valid timing information of the beam. As one example, a new MAC CE can be defined to configure the valid timing information of the selected beam with one or more of various fields. A field can include a TCI state field Ti that indicates the activation/deactivation status of the TCI state with TCI-StateId i. A field can include a time field ti that indicates the valid timing information of the TCI state Ti. Considering that the timing information can be indicated by different formats, various options can be considered. An option can include a number of time units. An option can include a pre-defined timer index.

A new MAC CE can be defined to configure a sequence of valid timing information pattern of the activated beam with or more of various fields. A field can include a TCI state field Ti that indicates the activation/deactivation status of the TCI state with TCI-StateId i. A field can include a number of time units field TUi that indicates the number of time units of the corresponding TCI state Ti. The number of time units field TU0 refer to the valid time of beam indicated by TCI state T0, the number of time units field TUI refer to the valid time of beam indicated by TCI state Tl and so on.

As one example, configuration can be via DCI. The DCI can be used to indicate the timing information, which can be simultaneously indicated with the TCI state via DCI. If TCI state is selected via a new DCI, a time information field "Time domain resource assignment" can be defined in this new DCI format to indicate the valid timing information of the configured forwarding beam. If TCI state is selected via the legacy DCI, a new field can be defined in legacy DCI to indicate the valid timing information to forward the signal with the configured beam. The timing information field in DCI can be one or more of a number of time units, a start time plus a time length as indicated similar as SLIV, and a pre-defined timer index.

As one example, the SN transmits to BS the feedback information after receiving the control information from BS via DC. To realize the forwarding operation of SN-FU, the BS can send the control information for SN-FU to the SN-CU via the first communication link, the control information includes can at least one of the beam information to forward the signal, timing information to align transmission/reception boundaries of SN, the UL-DL TDD configuration of SN, the on-off information to control the on/off status of SN, the power control information to control the forwarding power of SN-FU.

The control information can be configured in DCI. In this case, the above control information of SN-FU is advantageous in the forwarding operation. The BS can configure the SN to send the feedback information to the BS. In this case, a new higher layer parameter can be defined to indicate whether the SN needs to send the feedback information to the BS after received the control information for SN-FU. If configured this parameter, the SN needs to send the feedback information to the BS once received the control information for SN-FU. The feedback information can be sent over the PUCCH or PUSCH. If not configured this parameter, the SN does not need to send the feedback information to the BS.

Figure 5:
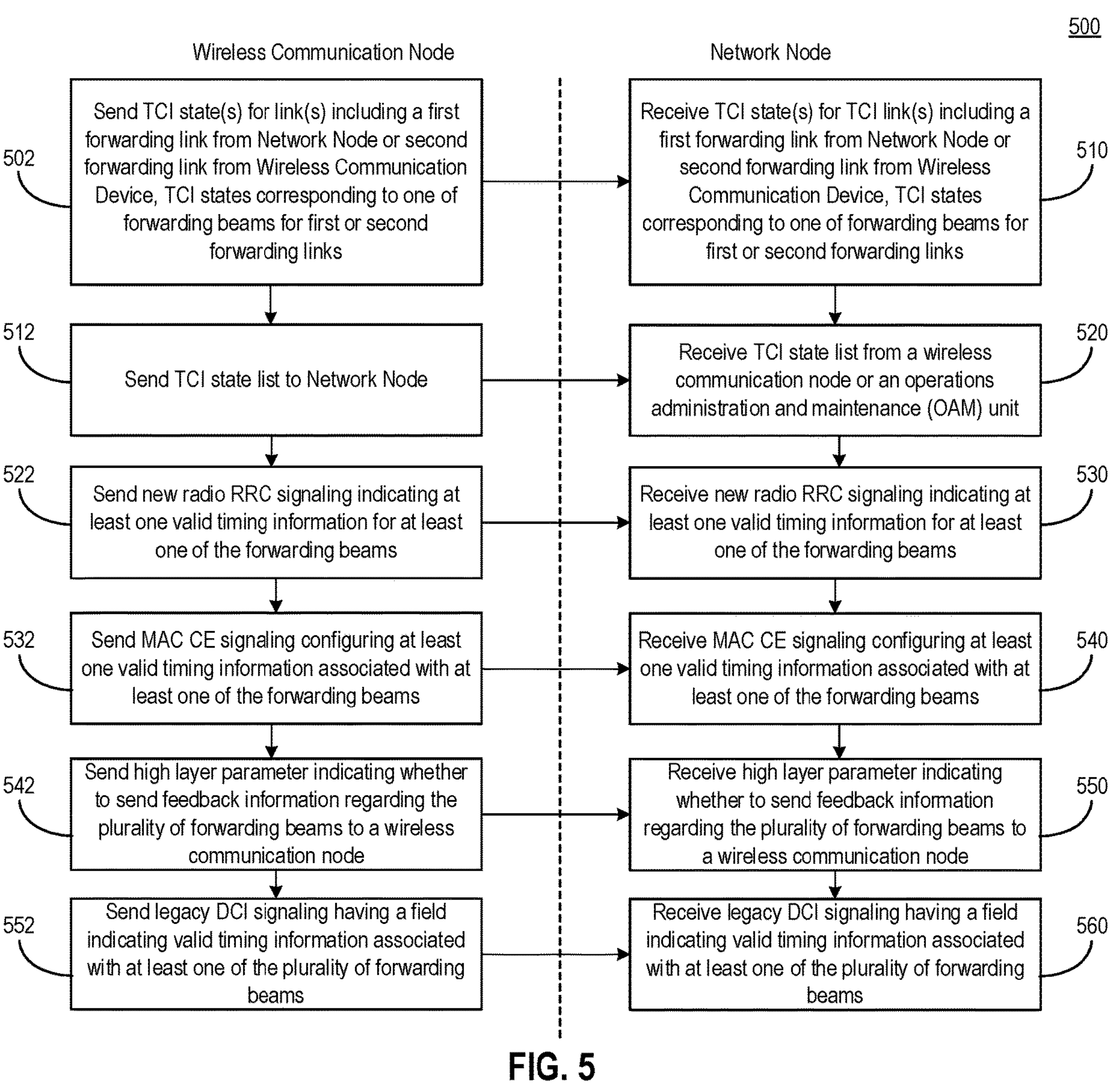
FIG. 5 is a diagram illustrating an example method for TCI configuration, according to various arrangements.

FIG. 5 is a diagram illustrating an example method for TCI configuration, according to various arrangements. At least one of the example systems 100 and 200 can perform method 500 according to present implementations. The method 500 can begin at 502 or 510.

At 502, the method can send, by the wireless communication device, one or more TCI states for one or more links including a first forwarding link from Network Node or second forwarding link from Wireless Communication Device, TCI states corresponding to one of forwarding beams for first or second forwarding links. The method 500 can then continue to 510 and 512.

At 510, the method can send, by the network node, TCI one or more states for one or more links including a first forwarding link from Network Node or second forwarding link from Wireless Communication Device, TCI states corresponding to one of forwarding beams for first or second forwarding links. The method 500 can then continue to 520. At 512, the method can send, by the wireless communication device, TCI state list to Network Node. The method 500 can then continue to 520 and 522.

At 520, the method can receive, by the network node, a TCI state list from a wireless communication node or an operations administration and maintenance (OAM) unit. The method 500 can then continue to 530. At 522, the method can send, by the wireless communication device, new radio RRC signaling indicating at least one valid timing information for at least one of the forwarding beams. The method 500 can then continue to 530 and 532.

At 530, the method can receive, by the network node, new radio RRC signaling indicating at least one valid timing information for at least one of the forwarding beams. The method 500 can then continue to 540. At 532, the method can send, by the wireless communication device, MAC CE signaling configuring at least one valid timing information associated with at least one of the forwarding beams. The method 500 can then continue to 540 and 542.

At 540, the method can receive, by the network node, MAC CE signaling configuring at least one valid timing information associated with at least one of the forwarding beams. The method 500 can then continue to 550. At 542, the method can send, by the wireless communication device, a high layer parameter indicating whether to send feedback information regarding the plurality of forwarding beams to a wireless communication node. The method 500 can then continue to 550 and 552.

At 550, the method can receive, by the network node, high layer parameter indicating whether to send feedback information regarding the plurality of forwarding beams to a wireless communication node. The method 500 can then continue to 560. At 552, the method can send, by the wireless communication device, legacy DCI signaling having a field indicating valid timing information associated with at least one of the plurality of forwarding beams. The method 500 can then continue to 560.

At 560, the method can receive legacy DCI signaling having a field indicating valid timing information associated with at least one of the plurality of forwarding beams. The method 500 can end at 560.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program (e.g., a computer program product) or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according arrangements of the present solution.

Additionally, memory or other storage, as well as communication components, may be employed in arrangements of the present solution. It will be appreciated that, for clarity purposes, the above description has described arrangements of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the arrangements described in this disclosure will be readily apparent to those skilled in the art, and the general principles defined herein can be applied to other arrangements without departing from the scope of this disclosure. Thus, the disclosure is not intended to be limited to the arrangements shown herein, but is to be accorded the widest scope consistent with the novel features and principles disclosed herein, as recited in the claims below.

What is claimed is:

1. A wireless communication method, comprising:

receiving, by a network node, via radio resource control (RRC) signaling, one or more Transmission Configuration Indicator (TCI) states for one or more links, the one or more links comprising at least one of a first forwarding link from the network node to a wireless communication device, or a second forwarding link from the wireless communication device to the network node, wherein the one or more TCI states each corresponds to a corresponding forwarding beam of a plurality of forwarding beams for the first forwarding link or the second forwarding link, wherein at least one of the one or more TCI states is configured by a wireless communication node separately from another one of the one or more TCI states corresponding to a beam of the network node for other links, wherein the one or more TCI states are associated with a corresponding one of a plurality of logic reference signal indices, and wherein a mapping relationship between the plurality of logic reference signal indices and the plurality of forwarding beams is indicated to the network node by the wireless communication node, and receiving, by the network node, a medium access control control element (MAC CE signaling configuring at least one valid timing information associated with at least one of the plurality of forwarding beams.

2. The wireless communication method of claim 1, wherein the plurality of logic reference signal indices or IDs are defined by a wireless communication node or an operations administration and maintenance (OAM) unit.

3. The wireless communication method of claim 1, wherein the one or more TCI states comprise at least one TCI state directly indicating a corresponding one of the forwarding beams.

4. The wireless communication method of claim 1, wherein the plurality of logic reference signal indices or IDs are SSB indices or CSI-RS indices, respectively.

5. The wireless communication method of claim 1, wherein the mapping relationship is updated and indicated to a network node by the wireless communication node.

6. The wireless communication method of claim 1, wherein at least one of the one or more TCI states, which is associated with a corresponding one of the plurality of logic reference signal indices or IDs indicated to the network node by a wireless communication node, is different from another one of the one or more TCI states corresponding to a beam of the network node for other links.

7. The wireless communication method of claim 1, wherein at least one of the one or more TCI states, which is associated with a corresponding one of the plurality of logic reference signal indices or IDs indicated to the network node by a wireless communication node, belongs to a part of configuration by the wireless communication node that is different from the other one of the one or more TCI states corresponding to the beam of the network node for the other links.

8. The wireless communication method of claim 1, wherein the valid timing information is in a first format that has a number of time units.

9. The wireless communication method of claim 1, wherein the valid timing information is in a second format that has a starting time and a time length.

10. The wireless communication method of claim 1, wherein the valid timing information is in a third format that has a starting time and an ending time.

11. The wireless communication method of claim 1, further comprising:

receiving, by the network node, a new medium access control control element (MAC CE) signaling configuring at least one valid timing information associated with at least one of the plurality of forwarding beams.

12. The wireless communication method of claim 11, wherein the valid timing information is in a first format that has a number of timing units.

13. The wireless communication method of claim 11, wherein the valid timing information is in a second format that has a starting time and a time length.

14. The wireless communication method of claim 1, further comprising:

receiving, by the network node, a new downlink control information (DCI) signaling having a field indicating at least one valid timing information associated with at least one of the plurality of forwarding beams.

15. The wireless communication method of claim 1, further comprising:

receiving, by the network node, a legacy downlink control information (DCI) signaling having a field indicating valid timing information associated with at least one of the plurality of forwarding beams.

16. The wireless communication method of claim 15, wherein the legacy DCI signaling comprises a newly defined field configured to indicate valid timing information for forwarding a signal using the configured beam when one or more TCI state is selected via a legacy downlink control information (DCI) signaling.

17. The wireless communication method of claim 1, wherein a higher-layer parameter is defined to indicate whether the network node transmits feedback information to the wireless communication device after receiving the control information for a secondary node forwarding unit (SN-FU) when the control information is configured in downlink control information (DCI) signaling.

18. A network node, comprising:

at least one processor configured to:

receive, via a receiver, via radio resource control (RRC) signaling, one or more Transmission Configuration Indicator (TCI) states for one or more links, the one or more links comprising at least one of a first forwarding link from the network node to a wireless communication device, or a second forwarding link from the wireless communication device to the network node, wherein the one or more TCI states each corresponds to a corresponding forwarding beam of a plurality of forwarding beams for the first forwarding link or the second forwarding link, wherein at least one of the one or more TCI states is configured by a wireless communication node separately from another one of the one or more TCI states corresponding to a beam of the network node for other links, wherein the one or more TCI states are associated with a corresponding one of a plurality of logic reference signal indices, and wherein a mapping relationship between the plurality of logic reference signal indices and the plurality of forwarding beams is indicated to the network node by the wireless communication node, and receive, via the receiver, a medium access control control element (MAC CE) signaling configuring at least one valid timing information associated with at least one of the plurality of forwarding beams.

19. A wireless communication node, comprising:

at least one processor configured to:

send, via a transmitter to a network node, via radio resource control (RRC) signaling, one or more Transmission Configuration Indicator (TCI) states for one or more links, the one or more links comprising at least one of a first forwarding link from the network node to a wireless communication device, or a second forwarding link from the wireless communication device to the network node, wherein the one or more TCI states each corresponds to a corresponding forwarding beam of a plurality of forwarding beams for the first forwarding link or the second forwarding link, wherein at least one of the one or more TCI states is separately configured by a wireless communication node compared to another one of the one or more TCI states corresponding to a beam of the network node for other links, wherein the one or more TCI states are associated with a corresponding one of a plurality of logic reference signal indices, and wherein a mapping relationship between the plurality of logic reference signal indices and the plurality of forwarding beams is indicated to the network node by the wireless communication node, and send, via the transmitter, a medium access control control element (MAC CE) signaling configuring at least one valid timing information associated with at least one of the plurality of forwarding beams.

20. A wireless communication method, comprising:

sending, by a wireless communication node to a network node, via radio resource control (RRC) signaling, one or more Transmission Configuration Indicator (TCI) states for one or more links, the one or more links comprising at least one of a first forwarding link from the network node to a wireless communication device, or a second forwarding link from the wireless communication device to the network node, wherein the one or more TCI states each corresponds to a corresponding forwarding beam of a plurality of forwarding beams for the first forwarding link or the second forwarding link, wherein the one or more TCI states comprise at least one TCI state directly indicating the corresponding forwarding beam, wherein at least one of the one or more TCI states is configured by a wireless communication node separately from another one of the one or more TCI states corresponding to a beam of the network node for other links, wherein the one or more TCI states are associated with a corresponding one of a plurality of logic reference signal indices, and wherein a mapping relationship between the plurality of logic reference signal indices and the plurality of forwarding beams is indicated to the network node by the wireless communication node, and sending, by the wireless communication node to the network node, a medium access control control element (MAC CE) signaling configuring at least one valid timing information associated with at least one of the plurality of forwarding beams.

* * * * *